(No Model.)

A. T. DOWDEN.
SPROCKET CHAIN.

No. 581,852.                      Patented May 4, 1897.

Witnesses:
R. C. Orwig
W. J. Sankey

Inventor: Ashford T. Dowden,
By Thomas C. and J. Ralph Orwig,
Attorneys.

UNITED STATES PATENT OFFICE.

ASHFORD T. DOWDEN, OF PRAIRIE CITY, IOWA.

SPROCKET-CHAIN.

SPECIFICATION forming part of Letters Patent No. 581,852, dated May 4, 1897.

Application filed September 24, 1896. Serial No. 606,903. (No model.)

*To all whom it may concern:*

Be it known that I, ASHFORD T. DOWDEN, a citizen of the United States of America, residing at Prairie City, in the county of Jasper and State of Iowa, have invented a new and useful Sprocket-Chain, of which the following is a specification.

The object of this invention is to provide a chain of the rectangular-link pattern that may travel over two sprockets whose axes are in the same plane, but at an angle relative to each other, so that the part of the chain between the sprockets may move in a segment laterally relative to the sprockets.

My invention consists in the construction of the links, as hereinafter set forth, pointed out in my claims, and illustrated in the accompanying drawings, in which—

Figure 1:
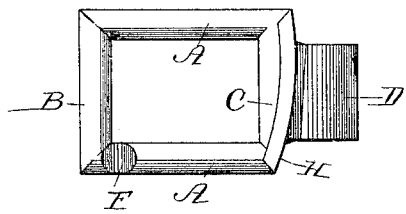
Figure 2:
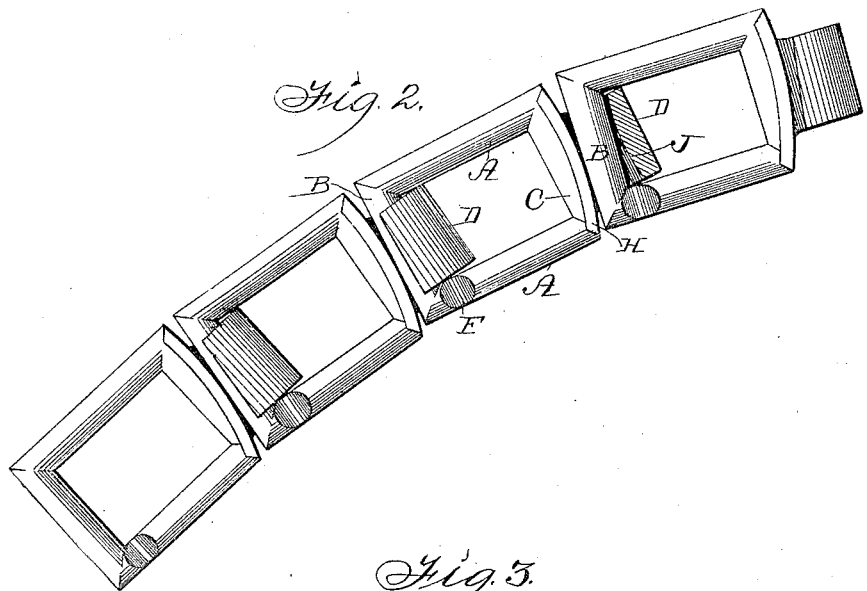
Figure 3:
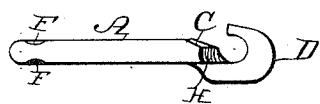

Figure 1 is a plan view of a link. Fig. 2 shows a portion of a chain having one of the hooks broken off to show its inside construction. Fig. 3 is a side elevation of a link.

The links of my improved chain are identical with those of the ordinary rectangular-link chain in that each has the parallel side pieces A, the rounded cross-piece B, which serves as the journal at one end, the cross-piece C at the opposite end, and the flat hook D, formed on said cross-piece and curved forwardly, upwardly, and then rearwardly, thus forming a bearing for the journal B of a contiguous link, the space between the end of the hook and the cross-piece D being slightly less than the diameter of the journal B, thus preventing the detachment of the links under ordinary usage. The links are connected originally and may be removed for repair, &c., by reason of the notches F F on the top and under surfaces of one of the side pieces A near the journal B. The portion of the side pieces thus narrowed may be passed between the end of the hook and the cross-piece. However, the links may be made of malleable metal and the hooks bent over the journal of the contiguous link.

To adapt the chain to bend laterally relative to sprockets in the same plane, but out of alinement, I have curved the outside surface of the cross-piece C at H, the portion of said surface farthest in advance being at the edge opposite from the direction of the lateral curve of the chain. The interior of the hook is curved at J in an opposite direction from the curve H, so that a journal B therein may stand at right angles to the sides of the link and engage the central portions of the curved surfaces H and J, or said journal may stand at an angle laterally relative to the link in which it rests and still engage each of said surfaces H and J, thus preventing a longitudinal movement of the links relative to each other.

If it is desirable to cause the chain to travel at any other angle than the one shown, or even in both directions laterally, the curve of the surfaces is merely changed to permit the movement.

Having thus described my invention, what I claim as new therein, and desire to secure by Letters Patent of the United States therefor, is—

1. A sprocket-chain composed of a number of links pivotally connected and capable of a limited movement relative to each other at right angles to their pivotal movement, each link comprising a rectangular frame, with a straight round cross-piece at one end and a flat hook at the other end designed to receive a mating cross-piece and to permit a pivotal movement between the two, and curved faces at the forward and rear inner surfaces of the hook to engage opposite sides of the straight cross-piece, substantially as and for the purposes stated.

2. A sprocket-chain composed of a number of links pivotally connected and capable of a limited movement relative to each other at right angles to their pivotal movement, each link comprising a rectangular frame, with a straight round cross-piece at one end, a notch in one of the side pieces, a convex outer surface on the other cross-piece formed by cutting away one corner only of said cross-piece and having one side of the link longer than the other, and a flat hook on the under side of said convex cross-piece, designed to receive a mating round cross-piece and having its inner surface that engages the inner edge of the round cross-piece convexed so that said cross-piece will be engaged at its outer and inner faces by the two said convexed surfaces at all times, substantially as and for the purposes stated.

ASHFORD T. DOWDEN.

Witnesses:
 H. C. GILL,
 D. H. GILL.